INVENTOR.
JACOB E. FEUCHT
BY
ATTORNEY

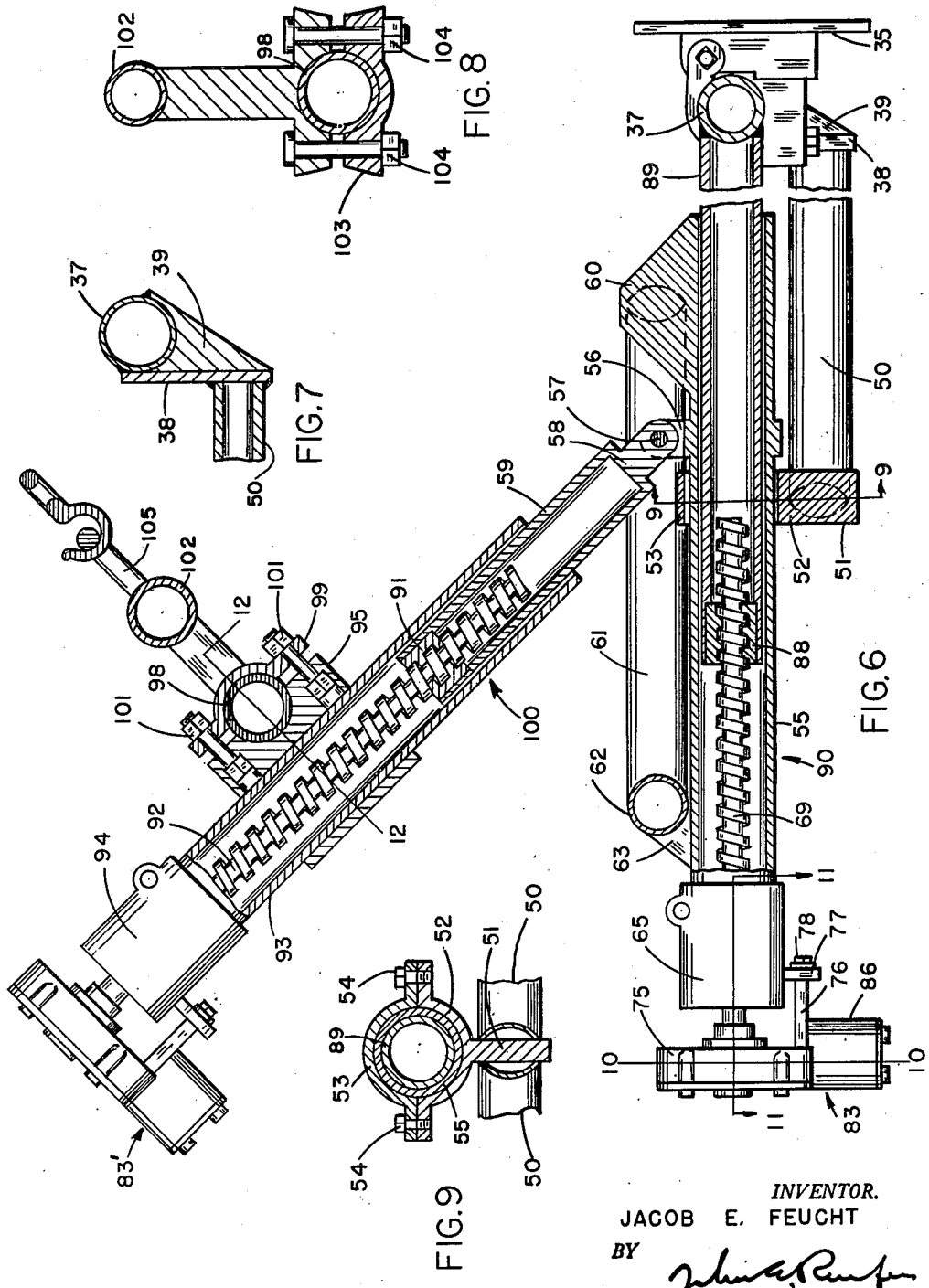

United States Patent Office 2,701,125
Patented Feb. 1, 1955

2,701,125

PIPE LINE DRILL RIG

Jacob E. Feucht, Garfield Heights, Ohio, assignor, by mesne assignments, to Westinghouse Air Brake Company, a corporation of Pennsylvania Application June 23, 1953, Serial No. 363,459

7 Claims. (Cl. 255—51)

This invention relates broadly to fluid actuated rock drills, but more particularly to a drill rig designed and constructed especially for ditch drilling work.

One object of this invention is to produce a drill rig adapted to be suspended to the winch cable of a derrick boom mounted on the side of a tractor in the usual manner, and to provide connecting means between the rig and the derrick boom to assist in supporting the rig and prevent it from swaying on its supporting cable.

Another object of this invention is to provide adjusting means for such cable supported rig enabling the drilling apparatus carried thereby to be plumbed or tilted to the desired drilling angle.

Another object of this invention is to produce a drill rig for pipe line work, which can be constructed and maintained in operative condition at relatively low cost.

Other objects of this invention will be apparent from the following detailed description, wherein similar characters of reference designate corresponding parts, and wherein:

Figure 6 is an enlarged longitudinal sectional view taken on line 6—6 in Figure 2.

Figure 7 is an enlarged longitudinal sectional view taken on line 7—7 in Figure 2.

Figure 8 is an enlarged longitudinal sectional view taken on line 8—8 in Figure 2.

Figure 9 is a cross-sectional view taken on line 9—9 in Figure 6.

Figure 12 is a cross-sectional view taken on line 12—12 in Figure 6.

Figure 1:
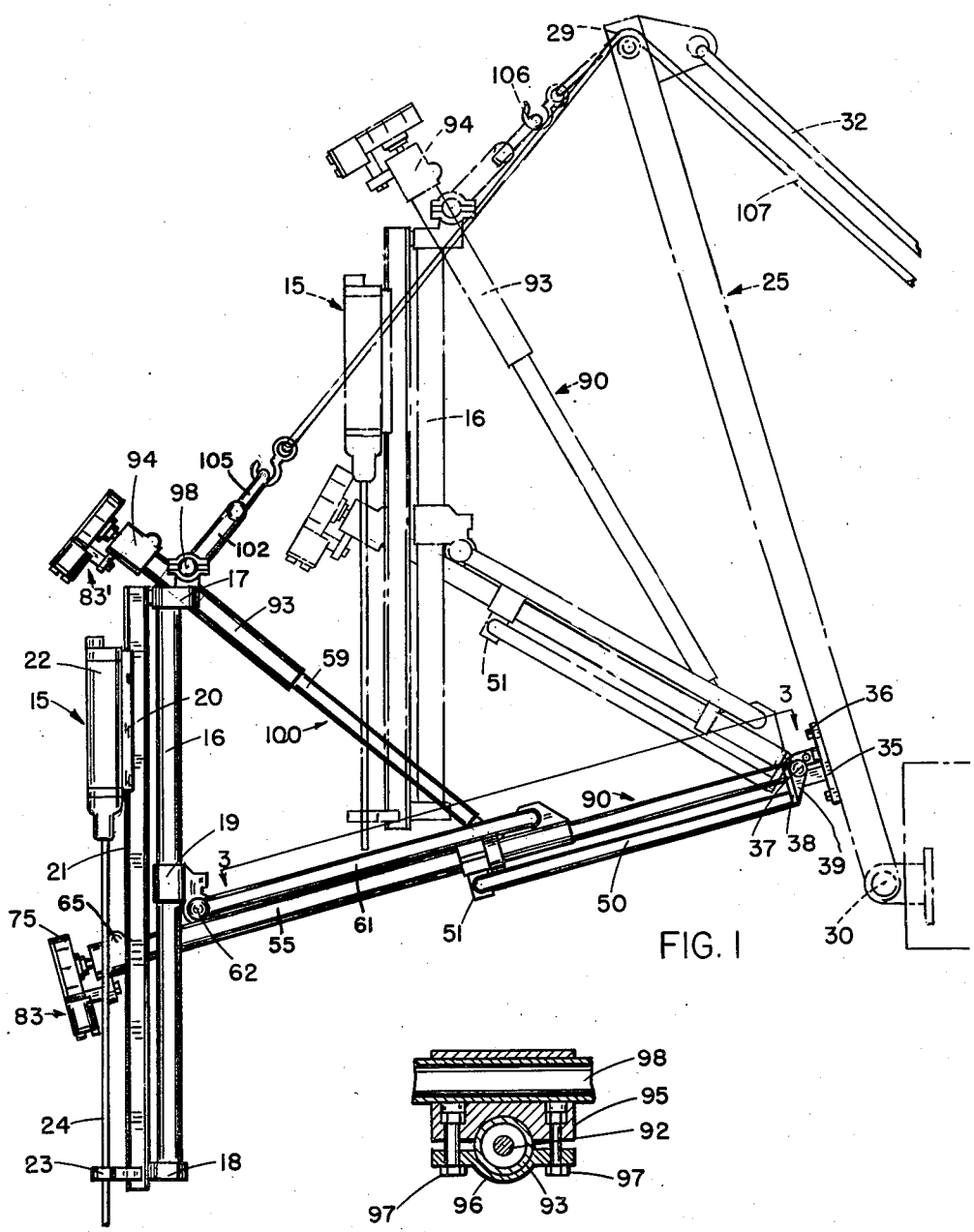
Figure 1 is a side elevational view of the drill rig shown in two different positions.

Referring to the drawings, 15 designates generally a fluid actuated drilling apparatus of the percussive type, comprising a feed cylinder 16 having fixed to the ends thereof upper and lower heads 17 and 18 respectively and a central clamp 19. A drill guiding beam 20 extends alongside of the feed cylinder 16 and is rigidly secured to the heads 17 and 18 thereof by suitable means, not shown. Beam 20 has two laterally spaced and parallel guides 21 extending the full length thereof, on which is slidably fitted a rock drill or drilling motor 22 having longitudinal movement imparted thereto in both directions by a mechanism housed within the feed cylinder 16. This drilling apparatus is of the usual well known type, and since it does not form a part of this invention, no further explanation is thought necessary, other than pointing out that the lower end of the beam 20 has operatively mounted thereon a drill steel centralizer 23 through which extends the usual drill steel 24, and that the drill rig about to be described is adapted to carry several drilling apparatus, two of which are shown in Figure 2.

Figure 2:
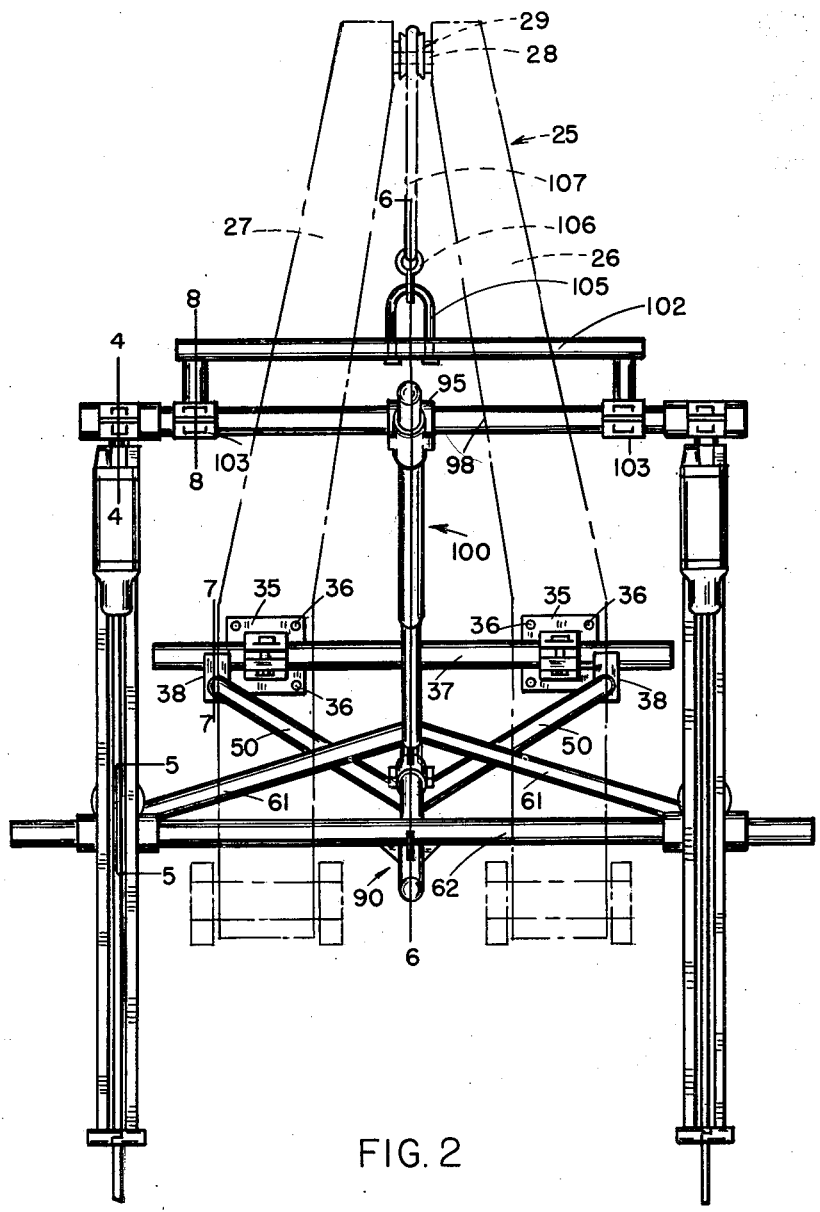
Figure 2 is a front elevational view of the drill rig.

The inverted V-shaped boom 25 of a derrick is shown in dotted line in Figures 1 and 2, its two beams 26 and 27 being united at their upper ends by a cross shaft 28 carrying a sheave 29, while their lower ends are pivotally connected as at 30 to the side of a tractor or the like, not shown. The boom 25 may be raised or lowered on its pivot axis 30 by a winch, mounted on the tractor, having a cable 32 fastened to the upper end of the boom.

Referring now more particularly to the invention, each beam 26 and 27 of the boom 25 has mounted on its outer face near the lower end thereof a bearing 35, detachably secured thereon by bolts 36 and having rotatably mounted therein a cross tubular member 37. This member extends horizontally transversally of the boom 25, and projects beyond the bearings 35 where each end portion has welded thereto a downwardly extending plate 38 reinforced by a rib 39, see Figure 7. The plates 38 have welded thereon the ends of two side arms 50 converging therefrom toward a tang 51 (Fig. 6) to which they are also welded to form an inverted V-shaped brace fixed on and extending laterally from the cross member 37. The tang 51 is, as shown in Fig. 9, an integral part of a sliding bearing 52 having a cap 53 detachably secured thereon by bolts 54.

Figure 3:
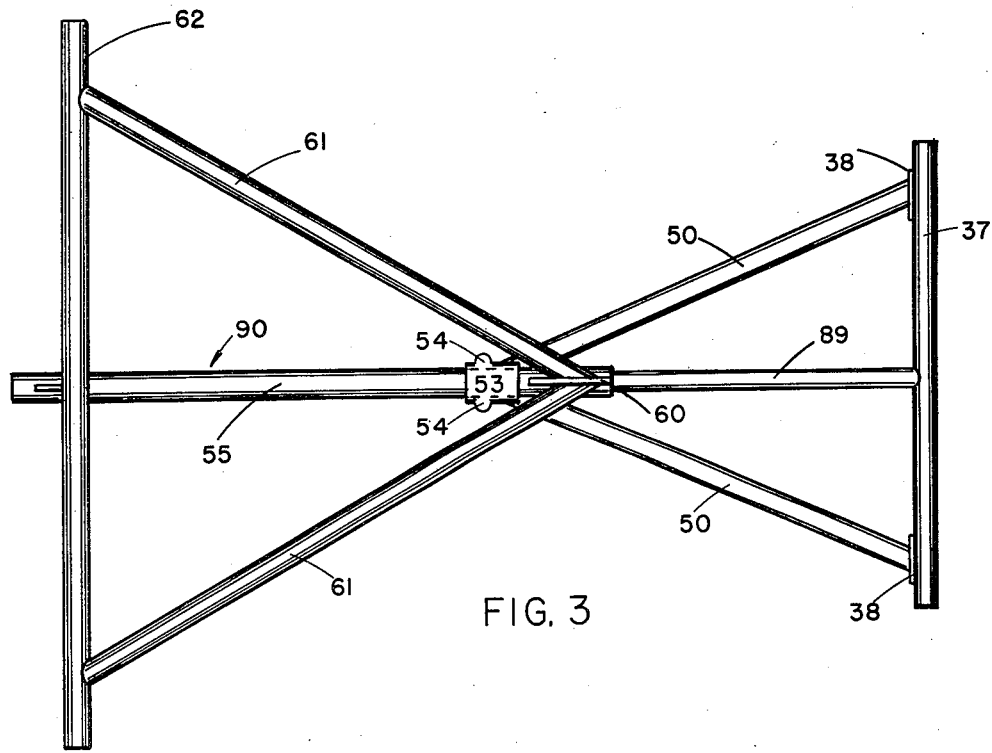
Figure 3 is a top plan view as seen from line 3—3 in Figure 1.
Figure 11:
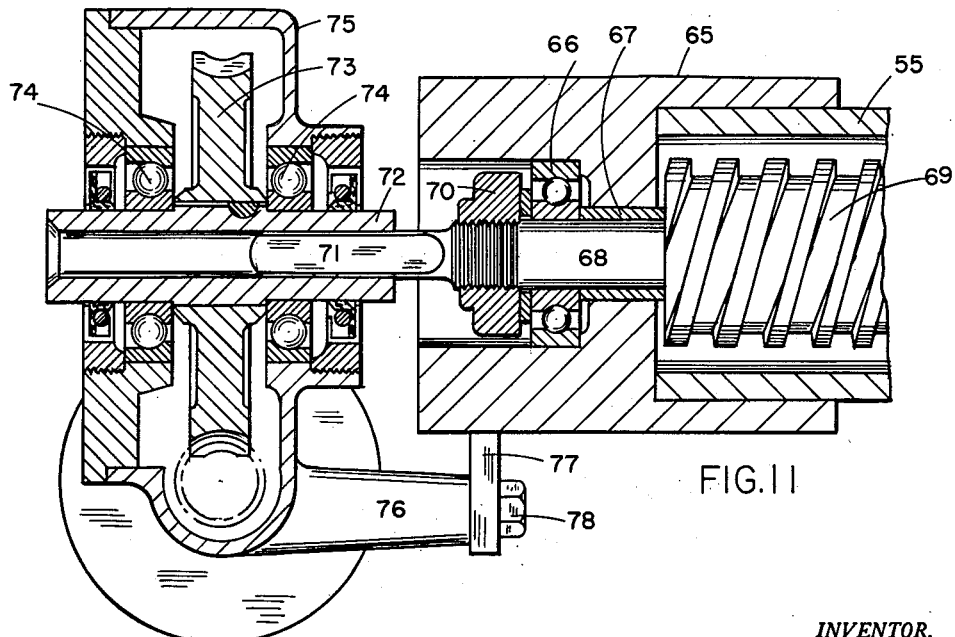
Figure 11 is an enlarged longitudinal sectional view taken on line 11—11 in Figure 6.

As shown in Figure 6, a relatively long tubular casing 55 is slidably supported within the bearing 52, and on one side of the latter is provided with two radially extending and laterally spaced apertured lugs 56 having pivotally mounted between them on a cross pin 57 the terminal 58 of another tubular member 59. Below the lugs 56, casing 55 is also provided with an integral tang 60 extending radially thereof at 180° from the tang 51, and having welded thereto the inner ends of two diverging tubular arms 61, which have their outer ends welded to a tubular cross member 62. The two arms 61 form another inverted V-shaped brace, larger than the one formed by the arms 50, both braces being parallel to but offset from the casing 55, one located above and the other below the casing. The cross member 62 is parallel to the cross member 37 but is offset therefrom as clearly shown in Figure 6. It is also longer than the other and extends at right angles from the casing 55 above the latter, to which it is rigidly secured by gussets 63 welded thereon. A cylindrical head 65 is fixed on the outer end of the casing 55, which head has mounted therein a ball bearing 66 (Fig. 11) and bushing 67 in which is journaled the shank 68 of a relatively large and long screw 69. The screw shank is retained in the head 65 by a nut 70, and has a polygonal end portion 71 extending therefrom into a correspondingly shaped hub 72 of a worm gear 73, which hub is journaled in ball bearings 74 mounted in a housing 75. This housing is fixed to the head 65 by a connection including a housing bracket 76 secured to the lug 77 of the head 65 by a bolt 78. A worm 80 in mesh with the worm gear 73 has its ends supported within ball bearings 81 mounted in the housing 75. Extending axially from the worm as an integral part thereof, there is the shaft 82 of a fluid actuated rotary motor 83. This motor is of the well known vane type generally comprising a rotor 84 within a stator 85, both housed within a motor housing 86 which is closed by a removable end plate 87. The screw 69 extends axially into the tubular casing 55 for operative engagement with a nut 88 fixed to the inner end of a tubular member 89, the outer end of which is welded to the short cross member 37 equidistantly from the ends thereof. It will thus be understood that the outer and inner members 55 and 89 respectively, as clearly shown in Figures 3 and 6, form a telescoping jack assembly 90, through which the two cross members 37 and 62 may be moved toward or away from each other, the jack being operated by the air motor 83 rotating the screw 69.

Figure 10:
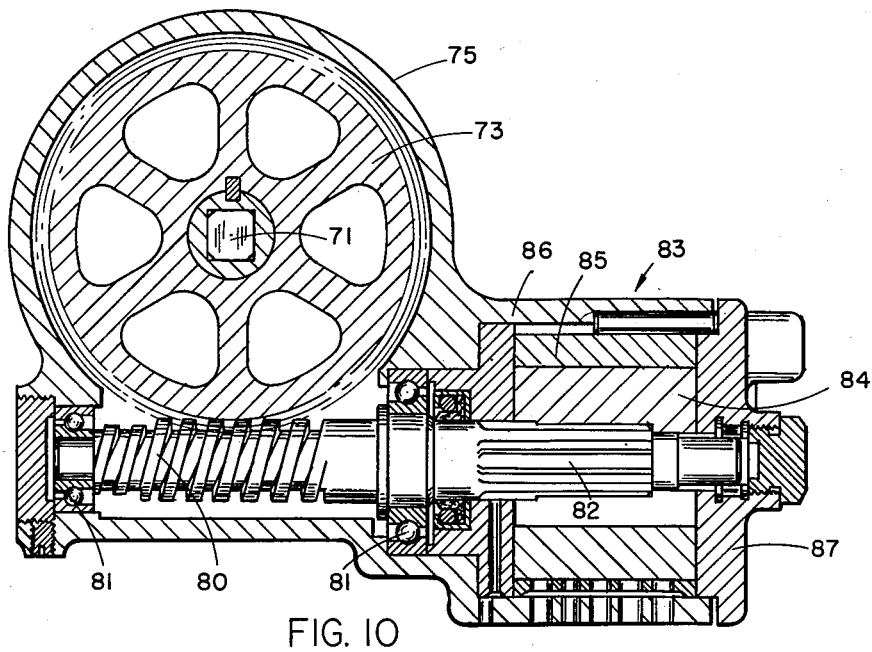
Figure 10 is an enlarged cross-sectional view taken on line 10—10 in Figure 6.

The tubular member 59, which as shown in Fig. 6 has its outer end 58 pivotally connected to the casing 55 by the cross pin 57, has fixed to its inner end a nut 91 cooperating with a screw 92, which is rotatably mounted within an outer tubular casing 93. This last casing slides over the inner member 59, and at its upper end carries a head 94. The head 94 is a replica of the head 65, and the screw 92 is actuated by the same mechanism, shown in Figures 10 and 11, as the screw 69, including an air motor 83'. Midway its length, the outer casing 93 has a coupler including a body portion 95 clamped thereon by a cap 96 (Fig. 12) and bolts 97. A third cross member 98 extends at right angles from the outer casing 93, and midway its length is clamped thereon by the coupler body portion 95, cap 99 and bolts 101. It will also be understood that the inner and outer tubular members 59 and 93 also form a telescoping jack 100 through which the cross member or arm 98 may be moved toward or away from the cross arm 62, the jack being operated by the air motor 83' rotating the screw 92.

A relatively wide U-shaped member or yoke 102 has its free end rigidly secured to the cross member 98 by the clamping arrangement shown in Figure 8, which includes a cap 103 and bolts 104. Midway the length of its cross bar, the yoke is provided with a loop 105 adapted to receive the eye-hook 106 fastened to the end of a winch cable 107 passing over the sheave 29.

Figure 4:
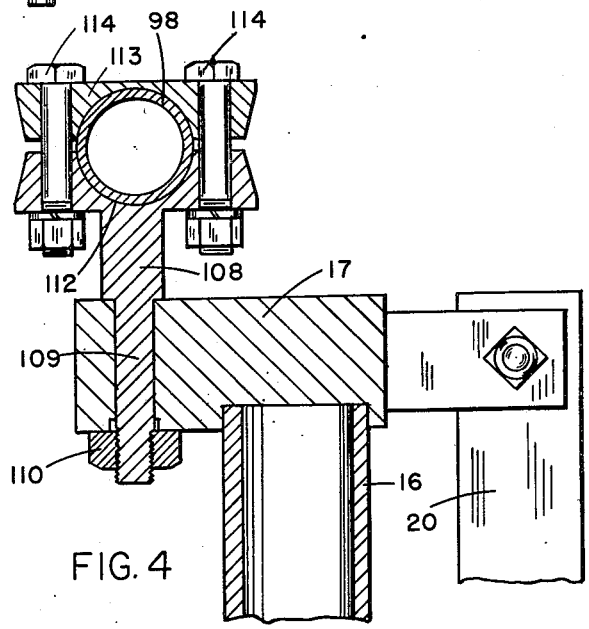
Figure 4 is an enlarged longitudinal sectional view taken on line 4—4 in Figure 2.
Figure 5:
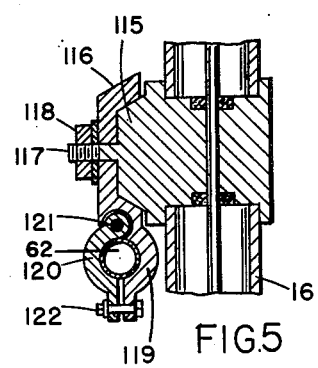
Figure 5 is an enlarged longitudinal sectional view taken on line 5—5 in Figure 2.

The cross members 62 and 98 constitute carrying members for the drilling apparatus 15 which have their upper heads 17 of the feed cylinders 16 connected to the cross member 98 by couplers 108, clearly shown in Figure 4, each coupler having a stem 109 extending through the head and secured thereby to a nut 110. The coupler is formed with semi-circular seat 112 cooperating with a similar cap 113, through which it may be clamped on the cross member 98 by bolts 114. In practice the cap 113 is preferably pulled tight enough to prevent looseness between the coupler and cross member but to enable relative rotation therebetween. Substantially midway of its length, the feed cylinder 16 has fixed thereon a cone member 115, clearly shown in Figure 5, extending radially therefrom. A saddle 116 is rotatable on the cone, and may be clamped thereon by a threaded stem 117 extending therethrough from the cone and cooperating with a nut 118. An integral semi-cylindrical jaw 119 extends laterally from the saddle, which jaw cooperates with a similar one 120 pinned to the saddle as at 121. The saddle 116 can then be clamped on the cross member 62 by the two jaws and a cross bolt 122.

While only two drilling apparatus 15 are shown, in practice generally two more are mounted one on each side of the telescopic jack 100. When a straight line drill hole pattern is required, such as required when working in a relatively narrow ditch, all drilling apparatus are mounted on the same sides of the cross members 62 and 98. However, when working in a wider ditch requiring a staggered pattern, the drilling apparatus can be mounted alternately inside and outside of the cross members 62 and 98. In order to afford rigidity between the two cross members 62 and 98 as well as to maintain a well balanced rig, it is desirable to mount one drilling apparatus on each end portion of the cross members as clearly shown in Figure 2.

From the foregoing description, it will be understood that the entire drill rig is pivotally supported by the cross member 37 and bearings 35 on the lower end of the derrick boom 25, and that its movement on that pivot can be effected by the winch cable 107, the winch of which, not shown, is preferably mounted on the tractor carrying the boom 25. As the tractor is moved on the bank of or parallel to the ditch being drilled, this pivotal movement of the rig on the pivot 37, has for its object to move the drill rig from one side of the ditch to the other, as illustrated by the two positions shown in Figure 1. After each of such pivotal movements, all drilling apparatus can be replumbed or positioned in any desired angular drilling position within a vertical plane at right angles with the cross members 62 and 98, by admitting motive fluid through a conduit, not shown, to operate the air motor 83', thereby causing extension or retraction of the telescopic jack 100 and pivotal movement of all drilling apparatus on the cross member 62. The drilling apparatus can also be made to swing on the cross member 98 within the vertical plane above referred to, by operating the air motor 83 and causing extension or retraction of the telescopic jack 90. In such event, the inverted V-shaped brace 50, located below the jack 90 and having its base fixed on the cross member 37, remains stationary together with the jack inner member 89, while the jack outer member 55 slides through the supporting bearing 52. Moving with the jack outer member 55 is of course the inverted V-shaped brace formed by the members 61 and the cross member 62. As clearly shown in Figures 1 and 6, the brace 61 affords a rigid connection from the inner end of the jack outer member 55 to the ends of the cross member 62, and since this cross member is fixed to the outer member 55 through the gussets 63, the brace is also an effective reenforcement between the end portions of the member 55.

The details of structure and arrangement of parts shown and described may be variously changed and modified without departing from the spirit and scope of the invention.

I claim:

1. A derrick supported drill rig including a first cross member rotatably carried by the lower end of a derrick boom transversally thereof, a second cross member parallel to the first one, a first telescopic jack having its inner member fixed to said first and its outer member fixed to said second cross member at right angles therewith, bracing means between the end portions of said second cross member and the inner end of said outer member, a supporting sliding bearing for said outer member, bracing means between the end portions of said first cross member and said bearing, a third cross member parallel and above said second one, a pair of elongated drilling apparatus attached to the end portion of said second and third cross members, a second telescopic jack between said outer member and said third cross member, and hanging means on said third cross member adapted to receive a winch cable operatively carried by said boom through which said drill rig may be pivoted about the center axis of said first cross member.

2. A derrick supported drill rig including a first cross member rotatably carried by the lower end of the derrick boom transversally thereof, a second cross member parallel to the first one, a substantially horizontal telescopic jack between said cross members at right angles therewith with its ends fixed thereto, bracing means fixed to the end portions of said second cross member and the inner end of the outer member of said jack and located below the latter, a supporting sliding bearing for said outer member, bracing means fixed to the end portions of said first cross member and said bearing and located above said jack, a third cross member parallel and above said second one, a pair of elongated drilling apparatus attached to the end portions of said second and third cross members, a second telescopic jack between said outer member and said third cross member, and hanging means on said third cross member adapted to receive a winch cable operatively carried by said boom through which said drill rig may be pivoted about the center axis of said first cross member.

3. A derrick supported drill rig including first and second parallel cross members, a telescopic jack between said cross members at right angles therewith with its ends fixed thereto, bracing means fixed to the end portions of said second cross member and the inner end of the outer member of said jack, supporting sliding bearing means for said outer member between its inner end and said second cross member, bracing means fixed to the end portions of said first cross member and to said bearing means, a third cross member parallel to and above said second cross member, a pair of elongated drilling apparatus extending between said second and third cross members and secured to the end portions thereof, a pivotal connection between said first cross member and the lower end of a derrick boom, and hanging means on said third cross member adapted to receive a winch cable operatively carried by said boom.

4. A drill rig including first and second laterally spaced and parallel cross members, an inverted V-shaped brace extending laterally from each of said members fixed to the end portion thereof, a jack having inner and outer telescopic members with their outer ends fixed to said members at right angles therewith, a fixed connection between the vertex of one of said braces and the inner end of said outer member, a supporting sliding bearing for said outer member, and fixed connection between the vertex of the other of said braces and said bearing, a pair of elongated drilling apparatus secured to said second cross member and extending above it, a third cross member carried by said drilling apparatus above said second one, a telescopic jack operatively connected to said third cross member and said outer member, a pivotal connection between said first cross member and a support, and hanging means on said third cross member adapted to receive a winch cable by which said last member is suspended.

5. A drill rig including first and second laterally spaced and parallel cross members, an inverted V-shaped brace for each of said members fixed to the end portions thereof and extending laterally thereof one above the other, a jack between said braces having inner and outer telescopic members fixed to said cross members at right angles therewith, a fixed connection between the vertex of one of said braces and said outer member, a supporting sliding bearing for said outer member between said connection and its outer end, a fixed connection between the vertex of the other of said braces and said bearing, a pair of elongated drilling apparatus secured to the end portions of said second cross member and extending above it, a third cross member carried by said apparatus above the second one, adjusting means between said third cross member and said outer member, supporting means for said first cross member including a pivotal connection therebetween, and hanging means on said third cross member adapted to receive a winch cable by which said last member is suspended.

6. A drill rig adapted to be carried by the boom of a movable derrick including a cross member, an inverted V-shaped brace extending laterally from said member with its free ends fixed thereto, a jack having inner and outer telescoping members, a fixed connection between the inner end of the jack outer member and the vertex of said brace, a supporting bearing for said jack, a V-shaped supporting brace for said bearing extending therefrom toward said boom, means pivotally connecting the outer end of said jack inner member and the free end of said last brace to the lower portion of said boom, a pair of drilling apparatus secured to said cross member and extending above it, another cross member secured to the upper ends of said drilling apparatus, and hanging means on said last cross member adapted to receive a winch cable operatively carried by said boom.

7. A drill rig adapted to be carried by the boom of a movable derrick including a cross member, an inverted V-shaped brace extending laterally from said members with its free end fixed thereto, a jack having inner and outer telescoping members with the outer one fixed to and below said brace at right angles therewith with said inner member extending toward said boom, a fixed connection between the inner end of said outer member and the vertex of said brace, a supporting bearing for said jack, a V-shaped supporting brace for said bearing extending therefrom below said jack toward said boom, means pivotally connecting the outer end of said inner member and the free end of said last brace to the lower portion of said boom, a pair of drilling apparatus secured to said cross member and extending above it, another cross member secured to the upper ends of said drilling apparatus, and hanging means on said last cross member adapted to receive a winch cable operatively carried by said boom.

References Cited in the file of this patent

UNITED STATES PATENTS

| | | |
|---|---|---|
| 2,044,880 | Greve et al. | June 23, 1936 |
| 2,048,072 | Johansen | July 21, 1936 |
| 2,316,672 | Curtis et al. | Apr. 13, 1943 |
| 2,635,855 | Gunning | Apr. 21, 1953 |